US012790502B2

(12) United States Patent
Chen et al.

(10) Patent No.: US 12,790,502 B2
(45) Date of Patent: Nov. 10, 2026

(54) CORROSION-RESISTANT COATING OF REINFORCING STEEL FOR MARINE CONCRETE AND PREPARATION METHOD THEREOF

(71) Applicant: GUILIN UNIVERSITY OF TECHNOLOGY, Guilin (CN)

(72) Inventors: Ping Chen, Guilin (CN); Yang Ming, Guilin (CN); Ling Li, Guilin (CN); Cheng Hu, Guilin (CN); Qing Li, Guilin (CN); Xuandong Chen, Guilin (CN); Rongjin Liu, Guilin (CN); Shunkai Li, Guilin (CN); Yanrong Zhao, Guilin (CN); Jiazhan Wei, Guilin (CN)

(73) Assignee: GUILIN UNIVERSITY OF TECHNOLOGY, Guilin (CN)

( * ) Notice: Subject to any disclaimer, the term of this patent is extended or adjusted under 35 U.S.C. 154(b) by 756 days.

(21) Appl. No.: 18/139,356

(22) Filed: Apr. 26, 2023

(65) Prior Publication Data

US 2023/0257597 A1 Aug. 17, 2023

Related U.S. Application Data

(63) Continuation of application No. PCT/CN2021/086894, filed on Apr. 13, 2021.

(30) Foreign Application Priority Data

Dec. 31, 2020 (CN) ........................ 202011638599.3

(51) Int. Cl.

*C09D 5/44* (2006.01)
*B01J 13/16* (2006.01)

(Continued)

(52) U.S. Cl.

CPC .............. *C09D 5/448* (2013.01); *B01J 13/16* (2013.01); *C09D 5/106* (2013.01); *C09D 5/4465* (2013.01); *C09D 175/14* (2013.01); *C25D 13/20* (2013.01)

(58) Field of Classification Search

CPC ...... C09D 5/4465; C09D 5/448; C09D 5/106; C09D 175/14; B01J 13/16; C25D 13/20

See application file for complete search history.

(56) References Cited

U.S. PATENT DOCUMENTS 4,031,050 A 6/1977 Xjerabek

FOREIGN PATENT DOCUMENTS

CN 102942835 A 2/2013
CN 105820742 A 8/2016

(Continued)

OTHER PUBLICATIONS

Li et al., Original & Machine Translation, CN 102942835 A (Year: 2013).*

(Continued)

*Primary Examiner* — Hosung Chung

(57) ABSTRACT

A preparation method for a corrosion-resistant coating of a reinforcing steel for marine concrete, comprising the steps: (1) pretreating the surface of a reinforcing steel; (2) preparing self-repairing corrosion microcapsules; (3) preparing a cathodic electrophoresis coating; (4) carrying out cathodic electrophoresis; and (5) curing. The electrophoresis coating of the present invention contains the self-repairing corrosion microcapsules, metal powder, and graphene oxide powder. The corrosion resistance of the coating is improved under the co-action of the self-repairing properties of the self-repairing microcapsules and cathodic protection. The corrosion-resistant coating has excellent adhesion and corrosion resistance, prolonging the service life of reinforcing (Continued)

steel. It is widely used for the protection of reinforcing steels for marine concrete, and also for the protection of metal structures in general environment.

6 Claims, 1 Drawing Sheet

(51) Int. Cl.

| | |
|---|---|
| ***C09D 5/10*** | (2006.01) |
| ***C09D 175/14*** | (2006.01) |
| ***C25D 13/20*** | (2006.01) |

(56) References Cited

FOREIGN PATENT DOCUMENTS

| | | | |
|---|---|---|---|
| CN | 106832183 | A | 6/2017 |
| CN | 110922803 | A | 3/2020 |
| CN | 111808468 | A | 10/2020 |
| CN | 111978818 | A | 11/2020 |
| CN | 111995929 | A | 11/2020 |

OTHER PUBLICATIONS

International Search Report issued in corresponding International application No. PCT/CN2021/086894, mailed Sep. 24, 2021.
Written Opinion of the International Searching Authority for No. PCT/CN2021/086894.

* cited by examiner

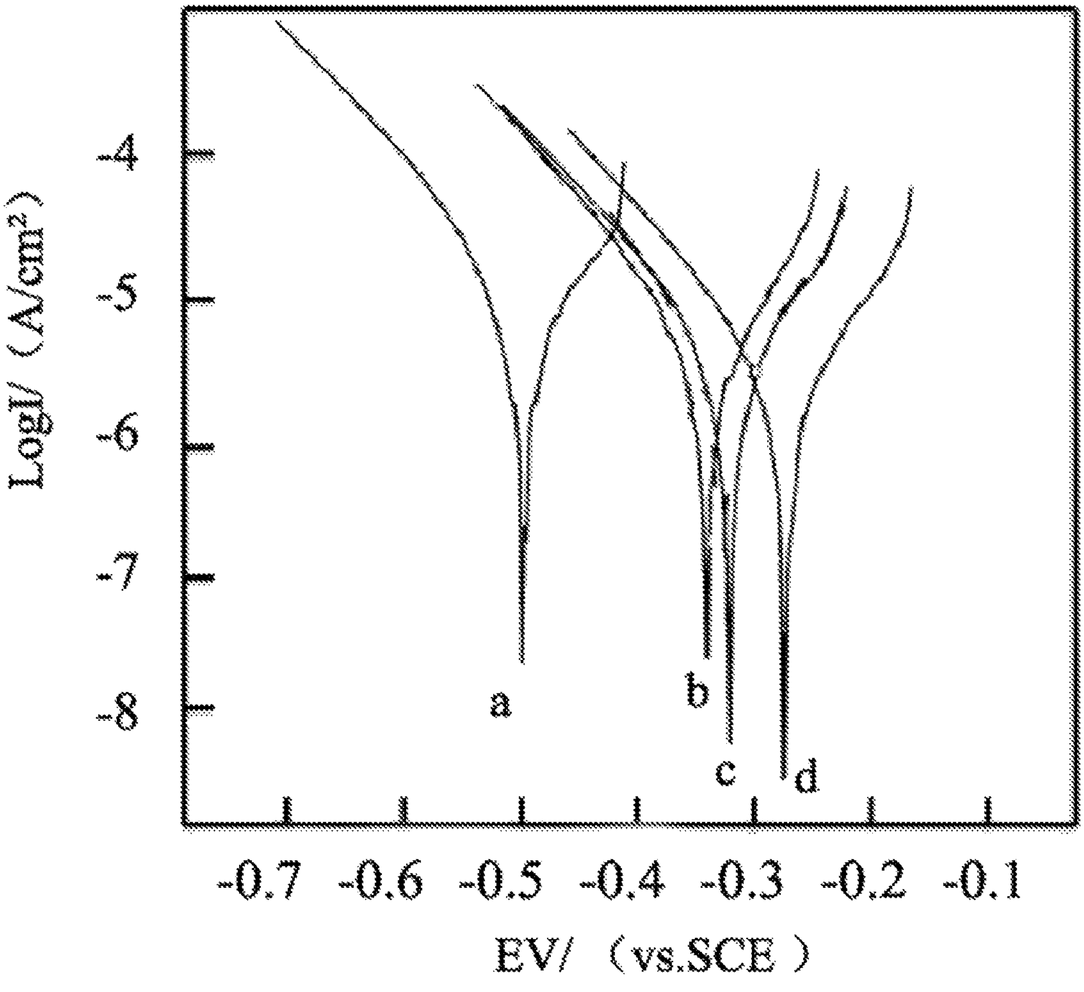
LogI/（A/cm²）
-4
-5
-6
-7
-8
a
b
c
d
-0.7
-0.6
-0.5
-0.4
-0.3
-0.2
-0.1
EV/（vs.SCE）

CORROSION-RESISTANT COATING OF REINFORCING STEEL FOR MARINE CONCRETE AND PREPARATION METHOD THEREOF

CROSS REFERENCE TO RELATED APPLICATIONS

This Chinese application is a national stage filing under section 371 of International Application No. PCT/CN2021/086894 filed on Apr. 13, 2021, which is published in Chinese on Jul. 7, 2022 as WO2022/141935, claiming the benefit of Chinese Application CN202011638599.3 for a graphene painting with anti-corrosion and heat dissipation properties (filed Dec. 31, 2020 at the China National Intellectual Property Administration, CNIPA). the disclosure of which are hereby incorporated by reference in their entirety.

FIELD OF THE INVENTION

The invention pertains to the field of reinforcement protection, in particular to a corrosion-resistant coating of a reinforcing steel for marine concrete and a preparation method thereof.

BACKGROUND OF THE INVENTION

In the prior art, concrete structures are widely used in the fields of construction and infrastructure. Reinforcement skeleton is generally used to improve the strength of concrete and it is used as reinforced concrete, which is the main material of marine infrastructure. However, it is easy to cause concrete structure damage due to the erosion of sea water, resulting in huge economic losses, and it is very difficult to repair. Chloride ion corrosion in seawater is an important cause of corrosion. The passivation film on the reinforcing steel surface is continuously dissolved and destroyed by local acidification and anodic depolarization. The damage of the corrosion battery to the passive film on the reinforcing steel surface occurs locally, which exposes the reinforcing steel substrate and forms a potential difference with the intact passive film area. The reinforcement steel is prone to corrosion as an anode. Although a lot of research has been done on the corrosion prevention of reinforcing steel, good results have also been achieved.

Chinese patent CN111378350A discloses a reinforcing steel with a pre-stressed anti-corrosion coating, by weight ratio, the coating includes 5%-30% filler and 70%-95% modified waterborne epoxy resin, wherein, the modified waterborne epoxy resin is prepared from the following raw materials: 10%-50% high elastic water-soluble polymer, 10%-60% waterborne epoxy resin and 10%-40% curing agent.

Chinese patent CN106380111A discloses a slow-release microcapsule containing a rust inhibitor and the preparation method thereof. The microcapsules can provide lasting protection for the reinforcing steel in concrete, however, the surface of the reinforcing steel is still exposed to a corrosive environment, as the microcapsules are dispersed in the whole concrete. There is still chloride ion and other corrosive media that may corrode the surface of the reinforcing stee.

Chinese patent CN105177679A relates to a method of electrophoretic deposition of graphene coating on carbon steel substrate, with low cost and simple operation. The graphene coating deposited by the method can improve the corrosion resistance, surface wear resistance and electrical conductivity of the carbon steel substrate.

With the wide application of reinforcing steel for marine concrete, how to improve its service life is still the direction and focus of the existing technology research.

SUMMARY OF THE INVENTION

To solve the problems in the prior art, the present invention is to provide a corrosion-resistant coating of a reinforcing steel for marine concrete and a preparation method thereof. The corrosion-resistant coating has excellent adhesion and corrosion resistance, which can effectively protect the reinforcing steel, and greatly prolongs the service life of the reinforcing steel for marine concrete.

In accordance with an aspect of the embodiment, the present invention provides a preparation method of the corrosion-resistant coating of the reinforcing steel for marine concrete, comprising the steps:

(1) pretreating a surface of the reinforcing steel; the reinforcing steel is ready to be used after a deoiling step, a acid pickling step, a water washing step and a sandblasting step;

(2) preparing a self-repairing corrosion microcapsules, comprising the steps:

(a1) adding urea in 10-12 weight portions, formaldehyde in 18-20 weight portions and ammonium chloride in 1-3 weight portions into an reactor, adding a pH regulator to adjust the pH value to 8-10, a temperature rises to 60° C.-80° C. after being stirred evenly, an urea-formaldehyde resin prepolymer is formed by a reflux reaction for 2-3 hours;

(b1) stirring for 10-15 minutes at a temperature of 50° C.-60° C. after mixing resorcinol in 5-10 weight portions, polyvinyl alcohol in 3-7 weight portions, linseed oil in 10-20 weight portions, 2-phenylbenzimidazole in 1-3 weight portions, emulsifying for 20-30 minutes to form an oily emulsion after adding 1-5 parts of deionized water and 0.1-0.5 parts of sodium dodecylbenzene sulfonate;

(c1) adding the urea-formaldehyde resin prepolymer obtained in step (a1) into the oily emulsion in step (b1), the pH value is adjusted to 3-4 with hydrochloric acid, the reflux reaction is carried out at 70° C.-90° C. for 2-3 hours, the obtained product is vacuum filtered, washed with deionized water and acetone, and dried in a drying oven to obtain a self-repairing corrosion microcapsules;

(3) preparing a cathodic electrophoretic coating, (a2) by weight, adding 5-10 parts of 2,4-toluene diisocyanate and 20-30 parts of propylene glycol methyl ether into a reaction kettle, after stirring and raising the temperature to 50° C.-60° C. under a protective atmosphere, dripping 3-5 parts of methyl isobutyl ketone within 2-3 hours, after completion, it is heated again to 110° C.-120° C. for reaction lasting for 2-3 hours, and the content of NCO group is measured to obtain a semi-blocked isocyanate;

(b2) in a reaction bottle equipped with a thermometer, a stirrer and a reflux condenser tube, 50-60 parts of water-based hydroxyacrylic resin, 10-30 parts of semi-closed isocyanate are added in turn, stirred and heated to 40° C.-60° C., and 2-5 parts of acetic acid, 1-5 parts of metal powder, 1-5 parts of graphene oxide powder, 5-10 parts of isopropanol and 10-30 parts of deionized water are added, then continue to stir for 10-20 minutes to prepare a colorant;

(c2) 30-50 parts of organic amine modified epoxy resin, 2-10 parts of diethylene glycol butyl ether, 5-15 parts of bisphenol A polyoxyethylene ether, 1-5 parts of methyl isobutyl ketone, 10-20 parts of semi-blocked isocyanate and 20-30 parts of deionization are mixed evenly to obtain a lotion with solid content of 30-50%;

(d2) the colorant and the lotion is mixed in proportion of (1:2)-(1:4), then 1-5 parts of deionized water is added, stirred and matured evenly for 24-48 hours; then 5-10 parts of self-repairing corrosion microcapsules are added and stirred for 10-30 minutes to the obtain cathodic electrophoretic coating, and then the cathodic electrophoretic coating is put into a cathodic electrophoretic tank;

(4) cathodic electrophoresis: placing the reinforcing steel in the cathodic electrophoresis tank, the process parameters of the electrophoresis are set as follows: the solid content of a tank liquid of the cathodic electrophoresis is 10%-15%, the pH value is 5.5-6.5, the conductivity is 200 us/cm-500 us/cm, the temperature of the tank liquid is 30° C.-50° C., the electrophoresis voltage is 50V-100V, and the electrophoresis duration is 3-10 minutes;

(5) curing: moving the electrophoresed reinforcing steel into the drying oven, at the temperature of 150° C.-200° C., and the duration for 20-40 minutes, and then cool it naturally.

Preferably, the pH regulator is sodium hydroxide or triethanolamine.

Preferably, the deoiling step is to put the reinforcing steel into an aqueous solution containing sodium carbonate with concentration of 20 g/L-30 g/L, sodium phosphate with concentration of 30 g/L-50 g/L, sodium silicate with concentration of 10 g/L-20 g/L for ultrasonic cleaning for 10-20 minutes; the deoiling temperature is 30° C.-50° C.

Preferably, the acid pickling step is to soak the reinforcing steel in a dilute hydrochloric acid solution with concentration of 0.5-1 mol/L for 5-10 minutes.

Preferably, the particle size of the metal powder is 50-80 μm; the particle size of graphene oxide powder is 10-30 μm.

Preferably, the metal powder is zinc powder or magnesium powder.

The present invention also provides a corrosion-resistant coating of the reinforcing steel for marine concrete, the corrosion-resistant coating is prepared by the method described above.

Semi-closed isocyanate curing agent provides good film-forming effect of the electrophoretic coating, ensures sufficient cross-link density of the paint film, and makes the electrophoretic coating have good physical and chemical properties.

The self-repairing microcapsules are prepared and added to the electrophoretic coating in the present invention. The microcapsule wrapped in the coating breaks under the external force, the repairing agent in the microcapsule flows out, and the repairing agent is filled with cracks under the action of capillary and polymerizes to complete the self-repairing process. The corrosion resistance of the coating is effectively improved by inhibiting the generation of cracks to ensure the compactness of the coating. In addition, 2-phenylbenzimidazole, a corrosion inhibitor, is added to the self-repairing microcapsule, which can also adsorb on the surface of reinforcement to inhibit corrosion in case of microcapsule fracture.

On the one hand, the present invention improves the corrosion resistance by electrophoretically preparing a dense protective coating on the reinforcing steel surface. On the other hand, the invention is combined with the principle of cathodic protection to add zinc or magnesium and other low-potential metal powder to the electrophoretic coating, the coating is easy to form cathodic protection circuit in the marine environment, further improving the corrosion resistance of the coating.

Graphene oxide has high hardness, the interlayer has a lubricating effect, which can improve the mechanical strength, impact resistance, flexibility and other mechanical properties of the electrophoretic coating. Moreover, graphene oxide itself has certain corrosion resistance, further improving the corrosion resistance of the electrophoresis coating.

Compared with the prior art, the present invention has the following advantages:

1. Although there are many studies on improving the corrosion resistance of coatings by using the self-repairing corrosion microcapsules in the prior art, the combination of cathodic protection and self-repairing corrosion microcapsules is rarely used.

2. After searching, the applicant found that there is few research on the addition of self-repairing corrosion microcapsules in electrophoretic coatings in the prior art, the corresponding electrophoretic coating and its application are prepared by adding self-repairing corrosion microcapsules to the electrophoretic coating in the present invention, thus, the electrophoretic method is realized to prepare a protective coating with excellent adhesion and high corrosion resistance on the surface of reinforcing steel.

3. The corrosion-resistant coating of the present invention is widely applied to the protection of reinforcement for marine concrete, and also to the protection of metallic structures in general environment.

BRIEF DESCRIPTION OF THE DRAWINGS

FIG. 1 shows the Tafel polarization curve of the corrosion-resistant coating prepared in embodiments 1-3.

DETAILED DESCRIPTION OF THE INVENTION

The present invention will become more fully understood from the detailed description given herein below and the accompanying drawings which are given by way of illustration only, and thus are not limitative of the present invention. The invention will be further described below in details with reference to the figures and embodiments.

The First Embodiment

A preparation method for a corrosion-resistant coating of a reinforcing steel for marine concrete, comprising the steps:

(1) pretreating the surface of the reinforcing steel: the reinforcing steel is ready to be used after a deoiling step, an acid pickling step, a water washing step and a sandblasting step; the deoiling step is to put the reinforcing steel into an aqueous solution containing sodium carbonate concentration of 20 g/L, sodium phosphate concentration of 30 g/L, sodium silicate concentration of 10 g/L for ultrasonic cleaning for 10 minutes; the deoiling temperature is 30° C. The acid pickling step is to soak the reinforcing steel in a dilute hydrochloric acid solution with a concentration of 0.5 mol/L for 5 minutes.

(2) preparing a self-repairing corrosion microcapsules, comprising the steps:

(a1) adding urea in 10 weight portions, formaldehyde in 18 weight portions and ammonium chloride in 1 weight portions into an reactor, adding a pH regulator to adjust the pH value to 8, a temperature rises to 60° C. after being stirred evenly, an urea-formaldehyde resin prepolymer is formed by a reflux reaction for 2 hours; Preferably, the pH regulator is sodium hydroxide or triethanolamine.

(b1) stirring for 10 minutes at a temperature of 50° C. after mixing resorcinol in 5 weight portions, polyvinyl alcohol in 3 weight portions, linseed oil in 10 weight portions, 2-phenylbenzimidazole in 1 weight portions, emulsifying for 20 minutes to form an oily emulsion after adding 1 part of deionized water and 0.1 part of sodium dodecylbenzene sulfonate;

(c1) adding the urea-formaldehyde resin prepolymer obtained in step (a1) into the oily emulsion in step (b1), the pH value is adjusted to 3 with hydrochloric acid, the reflux reaction is carried out at 70° C. for 2 hours, the obtained product is vacuum filtered, washed with deionized water and acetone, and dried in a drying oven to obtain the self-repairing corrosion microcapsules;

(3) preparing a cathodic electrophoretic coating;

(a2) by weight, adding 5 parts of 2,4-toluene diisocyanate and 20 parts of propylene glycol methyl ether into a reaction kettle, after stirring and raising the temperature to 50° C.-60° C. under a protective atmosphere, dripping 3 parts of methyl isobutyl ketone within 3 hours, after completion, it is heated again to 110° C. for reaction lasting for 2 hours, and the content of NCO group is measured to obtain a semi-blocked isocyanate;

(b2) in a reaction bottle equipped with a thermometer, a stirrer and a reflux condenser tube, 50 parts of water-based hydroxyacrylic resin, 10 parts of semi-closed isocyanate are added in turn, stirred and heated to 40° C., and 2 parts of acetic acid, 1 part of metal powder, 1 part of graphene oxide powder, 5 parts of isopropanol and 10 parts of deionized water are added, then continue to stir for 10 minutes to prepare a colorant;

(c2) 30 parts of organic amine modified epoxy resin, 2 parts of diethylene glycol butyl ether, 5 parts of bisphenol A polyoxyethylene ether, 1 part of methyl isobutyl ketone, 10 parts of semi-blocked isocyanate and 20 parts of deionization are mixed evenly to obtain a lotion with solid content of 30%; the particle size of the metal powder is 50 μm; the particle size of graphene oxide powder is 10 μm, the metal powder is zinc powder.

(d2) the colorant and the lotion is mixed in proportion of (1:2), then 1 part of deionized water is added, stirred and matured evenly for 24 hours; then 5 parts of self-repairing corrosion microcapsules are added and stirred for 10 minutes to the obtain cathodic electrophoretic coating, and then the cathodic electrophoretic coating is put into a cathodic electrophoretic tank;

(4) cathodic electrophoresis: placing the reinforcing steel in the cathodic electrophoresis tank, the process parameters of the electrophoresis are set as follows: the solid content of a tank liquid of the cathodic electrophoresis is 10%, the pH value is 5.5, the conductivity is 200 us/cm, the temperature of the tank liquid is 30° C., the electrophoresis voltage is 50V, and the electrophoresis duration is 3 minutes;

(5) curing: moving the electrophoresed reinforcing steel into the drying oven, at the temperature of 150° C., and the duration for 20 minutes, and then cool it naturally.

The Second Embodiment

A preparation method for a corrosion-resistant coating of the reinforcing steel for marine concrete, comprising the steps:

(1) pretreating the surface of the reinforcing steel: the reinforcing steel is ready to be used after a deoiling step, an acid pickling step, a water washing step and a sandblasting step; the deoiling step is to put the reinforcing steel into an aqueous solution containing sodium carbonate concentration of 25 g/L, sodium phosphate concentration of 40 g/L, sodium silicate concentration of 15 g/L for ultrasonic cleaning for 15 minutes; the deoiling temperature is 40° C. The acid pickling step is to soak the reinforcing steel in a dilute hydrochloric acid solution with a concentration of 0.8 mol/L for 7 minutes.

(2) preparing a self-repairing corrosion microcapsules, comprising the steps:

(a1) adding urea in 11 weight portions, formaldehyde in 19 weight portions and ammonium chloride in 2 weight portions into an reactor, adjusting the pH value to 9 by adding sodium hydroxide as a pH adjuster, a temperature rises to 70° C. after being stirred evenly, an urea-formaldehyde resin prepolymer is formed by a reflux reaction for 2.5 hours;

(b1) stirring for 12 minutes at a temperature of 55° C. after mixing resorcinol in 7 weight portions, polyvinyl alcohol in 5 weight portions, linseed oil in 15 weight portions, 2-phenylbenzimidazole in 2 weight portions, emulsifying for 25 minutes to form an oily emulsion after adding 3 parts of deionized water and 0.3 parts of sodium dodecylbenzene sulfonate;

(c1) adding the urea-formaldehyde resin prepolymer obtained in step (a1) into the oily emulsion in step (b1), the pH value is adjusted to 3.5 with hydrochloric acid, the reflux reaction is carried out at 80° C. for 2.5 hours, the obtained product is vacuum filtered, washed with deionized water and acetone, and dried in a drying oven to obtain the self-repairing corrosion microcapsules;

(3) preparing a cathodic electrophoretic coating;

(a2) by weight, adding 7 parts of 2,4-toluene diisocyanate and 25 parts of propylene glycol methyl ether into a reaction kettle, after stirring and raising the temperature to 55° C. under a protective atmosphere, dripping 4 parts of methyl isobutyl ketone within 3 hours, after completion, it is heated again to 115° C. for reaction lasting for 2.5 hours, and the content of NCO group is measured to obtain a semi-blocked isocyanate;

(b2) in a reaction bottle equipped with a thermometer, a stirrer and a reflux condenser tube, 55 parts of water-based hydroxyacrylic resin, 20 parts of semi-closed isocyanate are added in turn, stirred and heated to 50° C., and 4 parts of acetic acid, 3 parts of metal powder, 3 parts of graphene oxide powder, 8 parts of isopropanol and 20 parts of deionized water are added, then continue to stir for 15 minutes to prepare a colorant;

(c2) 40 parts of organic amine modified epoxy resin, 5 parts of diethylene glycol butyl ether, 10 parts of bisphenol A polyoxyethylene ether, 3 parts of methyl isobutyl ketone, 15 parts of semi-blocked isocyanate and 25 parts of deionization are mixed evenly to obtain a lotion with solid content of 40%; the particle size of the metal powder is 60 μm; the particle size of graphene oxide powder is 20 μm, the metal powder is zinc powder.

(d2) the colorant and the lotion is mixed in proportion of (1:3), then 3 part of deionized water is added, stirred and matured evenly for 36 hours; then 7 parts of self-repairing corrosion microcapsules are added and stirred for 20 minutes to the obtain cathodic electrophoretic coating, and then the cathodic electrophoretic coating is put into a cathodic electrophoretic tank;

(4) cathodic electrophoresis: placing the reinforcing steel in the cathodic electrophoresis tank, the process parameters of the electrophoresis are set as follows: the solid content of a tank liquid of the cathodic electrophoresis is 12%, the pH value is 6, the conductivity is 300 us/cm, the temperature of the tank liquid is 40° C., the electrophoresis voltage is 70V, and the electrophoresis duration is 5 minutes;

(5) curing: moving the electrophoresed reinforcing steel into the drying oven, at the temperature of 180° C., and the duration for 30 minutes, and then cool it naturally.

The Third Embodiment

A preparation method for a corrosion-resistant coating of the reinforcing steel for marine concrete, comprising the steps:

pretreating the surface of the reinforcing steel: the reinforcing steel is ready to be used after a deoiling step, an acid pickling step, a water washing step and a sandblasting step; the deoiling step is to put the reinforcing steel into an aqueous solution containing sodium carbonate concentration of 30 g/L, sodium phosphate concentration of 50 g/L, sodium silicate concentration of 20 g/L for ultrasonic cleaning for 20 minutes; the deoiling temperature is 50° C. The acid pickling step is to soak the reinforcing steel in a dilute hydrochloric acid solution with a concentration of 1 mol/L for 10 minutes.

(2) preparing a self-repairing corrosion microcapsules, comprising the steps:

(a1) adding urea in 12 weight portions, formaldehyde in 20 weight portions and ammonium chloride in 3 weight portions into an reactor, adjusting the pH to 10 by adding triethanolamine as a pH adjuster, a temperature rises to 80° C. after being stirred evenly, an urea-formaldehyde resin prepolymer is formed by a reflux reaction for 3 hours;

(b1) stirring for 15 minutes at a temperature of 60° C. after mixing resorcinol in 10 weight portions, polyvinyl alcohol in 7 weight portions, linseed oil in 20 weight portions, 2-phenylbenzimidazole in 3 weight portions, emulsifying for 30 minutes to form an oily emulsion after adding 5 parts of deionized water and 0.5 parts of sodium dodecylbenzene sulfonate;

(c1) adding the urea-formaldehyde resin prepolymer obtained in step (a1) into the oily emulsion in step (b1), the pH value is adjusted to 4 with hydrochloric acid, the reflux reaction is carried out at 90° C. for 3 hours, the obtained product is vacuum filtered, washed with deionized water and acetone, and dried in a drying oven to obtain the self-repairing corrosion microcapsules;

(3) preparing a cathodic electrophoretic coating;

(a2) by weight, adding 10 parts of 2,4-toluene diisocyanate and 30 parts of propylene glycol methyl ether into a reaction kettle, after stirring and raising the temperature to 60° C. under a protective atmosphere, dripping 5 parts of methyl isobutyl ketone within 3 hours, after completion, it is heated again to 120° C. for reaction lasting for 3 hours, and the content of NCO group is measured to obtain a semi-blocked isocyanate;

(b2) in a reaction bottle equipped with a thermometer, a stirrer and a reflux condenser tube, 60 parts of water-based hydroxyacrylic resin, 30 parts of semi-closed isocyanate are added in turn, stirred and heated to 60° C., and 6 parts of acetic acid, 5 parts of metal powder, 5 parts of graphene oxide powder, 10 parts of isopropanol and 30 parts of deionized water are added, then continue to stir for 20 minutes to prepare a colorant;

(c2) 50 parts of organic amine modified epoxy resin, 10 parts of diethylene glycol butyl ether, 15 parts of bisphenol A polyoxyethylene ether, 5 parts of methyl isobutyl ketone, 20 parts of semi-blocked isocyanate and 30 parts of deionization are mixed evenly to obtain a lotion with solid content of 50%; the particle size of the metal powder is 80 μm; the particle size of graphene oxide powder is 30 μm, the metal powder is zinc powder.

(d2) the colorant and the lotion is mixed in proportion of (1:4), then 5 parts of deionized water is added, stirred and matured evenly for 48 hours; then 5 parts of self-repairing corrosion microcapsules are added and stirred for 30 minutes to the obtain cathodic electrophoretic coating, and then the cathodic electrophoretic coating is put into a cathodic electrophoretic tank;

(4) cathodic electrophoresis: placing the reinforcing steel in the cathodic electrophoresis tank, the process parameters of the electrophoresis are set as follows: the solid content of a tank liquid of the cathodic electrophoresis is 15%, the pH value is 6.5, the conductivity is 500 us/cm, the temperature of the tank liquid is 50° C., the electrophoresis voltage is 100V, and the electrophoresis duration is 10 minutes;

(5) curing: moving the electrophoresed reinforcing steel into the drying oven, at the temperature of 200° C., and the duration for 40 minutes, and then cool it naturally.

1. The reinforcing steel coating prepared above is tested for adhesion, according to the specification requirements of the "Paints and varnishes-Pull-off test for adhesion", the adhesion effect of corrosion-resistant coatings is tested, and the adhesion of the coating with the reinforcing steel is obtained via the pull-off test. The results are shown in Table 1.

TABLE 1

| | First Embodiment | Second Embodiment | Third Embodiment |
|---|---|---|---|
| Adhesive Strength(MPa) | 23.2 | 25.4 | 21.7 |

It can be seen from the adhesion data that the corrosion-resistant coating prepared according to the invention has a high-adhesive strength, which can ensure that the coating is not easy to fall off under external forces.

2. The corrosion-resistant coating and the bare reinforcing steel according to the above three embodiments are tested for corrosion performance. The test was carried out using the PARDAT electrochemical workstation, a standard three-electrode system comprised of a reference electrode as saturated calomel electrode, an auxiliary electrode as a high-purity graphite rod, and a working electrode as a sample to be tested. The corrosion electrolyte is NaCl solution with a mass fraction of 3.5 wt %, and the polarization curve of the sample is tested, wherein curves a, b, c, d correspond to the polarization curves of bare reinforcing steel and examples 1-3, respectively. The corrosion potential and corrosion current density are obtained by a Tafel curve extrapolation method, which are shown in Table 2.

TABLE 2

| | Exposed reinforcing steel | First Embodiment | Second Embodiment | Third Embodiment |
|---|---|---|---|---|
| Corrosion Potential (V) | −0.51 | −0.32 | −0.31 | −0.28 |
| Corrosion current density (A) | $5.2 \times 10^{-7}$ | $4.1 \times 10^{-7}$ | $2.5 \times 10^{-8}$ | $1.3 \times 10^{-9}$ |

From the Tafle polarization curve and its fitting data, it can be seen that The corrosion-resistant coating prepared by the present invention has a corrected corrosion potential, lower than −0.51V of the bare reinforcing steel, and the corrosion current density is as low as $10^{-9}$ orders of magnitude, showing that the coating has excellent corrosion resistance.

The above embodiments, which are intended to enable those skilled in the art to understand the content of the disclosure and implement it accordingly, are merely for describing the technical concepts and features of the disclosure, and the scope of patent application of the disclosure cannot be defined only by the embodiments, i.e., any equivalent variations or modifications made in accordance with the spirit disclosed by the disclosure still fall within the scope of claims of the disclosure.

What is claimed is:

1. A preparation method for a corrosion-resistant coating of a reinforcing steel for marine concrete, comprising the steps:

(1) pretreating a surface of the reinforcing steel; the reinforcing steel is ready to be used after a deoiling step, an acid pickling step, a water washing step and a sandblasting step;

(2) preparing self-repairing corrosion microcapsules, comprising the steps:

(a1) adding urea in 10-12 weight portions, formaldehyde in 18-20 weight portions and ammonium chloride in 1-3 weight portions into a reactor, adding a pH regulator to adjust the pH value to 8-10, a temperature rises to 60° C.-80° C. after being stirred evenly, a urea-formaldehyde resin prepolymer is formed by a reflux reaction for 2-3 hours;

(b1) stirring for 10-15 minutes at a temperature of 50° C.-60° C. after mixing resorcinol in 5-10 weight portions, polyvinyl alcohol in 3-7 weight portions, linseed oil in 10-20 weight portions, 2-phenylbenzimidazole in 1-3 weight portions, emulsifying for 20-30 minutes to form an oily emulsion after adding 1-5 parts of deionized water and 0.1-0.5 parts of sodium dodecylbenzene sulfonate;

(c1) adding the urea-formaldehyde resin prepolymer obtained in step (a1) into the oily emulsion in step (b1), the pH value is adjusted to 3-4 with hydrochloric acid, the reflux reaction is carried out at 70° C.-90° C. for 2-3 hours, the obtained product is vacuum filtered, washed with deionized water and acetone, and dried in a drying oven to obtain the self-repairing corrosion microcapsules;

(3) preparing a cathodic electrophoretic coating, (a2) by weight, adding 5-10 parts of 2,4-toluene diisocyanate and 20-30 parts of propylene glycol methyl ether into a reaction kettle, after stirring and raising the temperature to 50° C.-60° C. under a protective atmosphere, dripping 3-5 parts of methyl isobutyl ketone within 2-3 hours, after completion, it is heated again to 110° C.-120° C. for reaction lasting for 2-3 hours, and the content of NCO group is measured to obtain a semi-blocked isocyanate;

(b2) in a reaction bottle equipped with a thermometer, a stirrer and a reflux condenser tube, 50-60 parts of water-based hydroxyacrylic resin, 10-30 parts of semi-closed isocyanate are added in turn, it is stirred and raised to 40° C.-60° C., and 2-5 parts of acetic acid, 1-5 parts of metal powder, 1-5 parts of graphene oxide powder, 5-10 parts of isopropanol and 10-30 parts of deionized water are added, then continue to stir for 10-20 minutes to prepare a colorant;

(c2) 30-50 parts of organic amine modified epoxy resin, 2-10 parts of diethylene glycol butyl ether, 5-15 parts of bisphenol A polyoxyethylene ether, 1-5 parts of methyl isobutyl ketone, 10-20 parts of semi-blocked isocyanate and 20-30 parts of deionization are mixed evenly to obtain a lotion with a solid content of 30-50%;

(d2) the colorant and the lotion are mixed in a proportion of (1:2)-(1:4), then 1-5 parts of deionized water are added, stirred, and matured evenly for 24-48 hours; then 5-10 parts of self-repairing corrosion microcapsules are added and stirred for 10-30 minutes to obtain the cathodic electrophoretic coating, and then the cathodic electrophoretic coating is put into a cathodic electrophoretic tank;

(4) cathodic electrophoresis: placing the reinforcing steel in the cathodic electrophoresis tank, the process parameters of the electrophoresis are set as follows: the solid content of a tank liquid of the cathodic electrophoresis is 10%-15%, the pH value is 5.5-6.5, the conductivity is 200-500 μs/cm, the temperature of the tank liquid is 30° C.-50° C., the electrophoresis voltage is 50-100 V, and the electrophoresis duration is 3-10 minutes;

(5) curing: moving the electrophoresed reinforcing steel into the drying oven, at the temperature of 150° C.-200° C., and the duration is for 20-40 minutes, and then cool it naturally.

2. The method as defined in claim 1, wherein the pH regulator is sodium hydroxide or triethanolamine.

3. The method as defined in claim 1, wherein the deoiling step is to put the reinforcing steel into an aqueous solution containing sodium carbonate concentration of 20 g/L-30 g/L, sodium phosphate concentration of 30 g/L-50 g/L, sodium silicate concentration of 10 g/L-20 g/L for ultrasonic cleaning for 10-20 minutes; the deoiling temperature is 30° C.-50° C.

4. The method as defined in claim 1, wherein the acid pickling step is to soak the reinforcing steel in a dilute hydrochloric acid solution with a concentration of 0.5-1 mol/L for 5-10 minutes.

5. The method as defined in claim 1, wherein the particle size of the metal powder is 50-80 μm; and the particle size of graphene oxide powder is 10-30 μm.

6. The method as defined in claim 1, wherein the metal powder is zinc powder or magnesium powder.

* * * * *